Patented Sept. 16, 1952

2,610,963

UNITED STATES PATENT OFFICE 2,610,963

FIBER-FORMING COPOLYMERS OF 1,3-BUTADIENES WITH DIALKYL METHYLENE-MALONATES

Kenneth W. Doak, Nutley, N. J., and Kenneth E. Wilzbach, Chicago, Ill., assignors to United States Rubber Company, New York, N. Y., a corporation of New Jersey No Drawing. Application April 14, 1949, Serial No. 87,553

21 Claims. (Cl. 260—78.5)

This invention relates to a new class of petroleum-oil-resistant, unsaturated, crystalline copolymers which have a highly alternating structure, that is, copolymers in which most of the monomer units alternate in the polymer chain. More particularly, the invention relates to crystalline, petroleum - oil - insoluble, fiber-forming plastics which are unsaturated, alternating copolymers of certain 1,3-butadienes with certain lower alkyl esters of methylenemalonic acid.

It is well known that dialkyl methylenemalonates will react with conjugated dienes to yield solely non-polymeric chemicals of the Diels-Alder adduct type (cf. U. S. Patent 2,313,501). It has now been discovered that in the presence of a source of free radicals, e. g., a compound or mixture of compounds capable of decomposing to yield free radicals, such as a peroxidic compound, this Diels-Alder addition reaction does not occur to any appreciable extent, but instead, the dialkyl methylenemalonate reacts with the 1,3-butadiene in an entirely different manner to yield an oil-soluble, unsaturated copolymer containing essentially equimolar quantities of the combined dialkyl methylenemalonate and 1,3-butadiene. These copolymers are tough, non-rubbery, fiber-forming plastic substances, and are characterized by a high degree of crystallinity.

Further, it has been discovered that the copolymers of the 1,3-butadiene, (A), and the methylenemalonic ester, (B), employed in this invention, have a chain structure in which the monomer units alternate thus:

. . . ABABABABAB . . .

and the composition of the copolymers is, over rather wide limits, relatively independent of the composition of the feed. This very strong tendency to alternate in copolymerization is an unexpected and novel feature of the monomer pairs of this invention, since the monomer pairs previously employed usually have not shown a tendency to alternate to any such great extent. Thus, in the conventional copolymerization of styrene (S) and methyl methacrylate (M) from a 1:1 molar ratio feed, a copolymer of constant 1:1 composition is obtained, but the units are distributed almost at random along the chain, for instance, thus:

. . . SMSSMSMMMSMSSMSMMSSMSM . . .

Further, in such conventional copolymerization, if one monomer, say S, is present in excess in the feed, it will also predominate in the copolymer, thus:

. . . SMSSSMSSMMSSSMSMSSMSSM . . .

A further advantage of the present invention is that an alternating copolymer is obtained from reaction mixtures in which the molar ratio of the monomers is 1:1, so that complete alternation can be obtained at high copolymer yields.

That the copolymers of this invention are crystalline, oil-insoluble, fiber-forming copolymers is particularly unexpected in view of the fact that the copolymerization reaction of conjugated dienes with certain other alkyl esters of acids containing the group $H_2C=C<$ has heretofore been believed by those skilled in the art to result in non-crystalline, mineral oil-soluble, non-fiber-forming products containing a relatively high percentage of combined diene, say at least 5 moles of diene to 3 moles of unsaturated ester, as shown in U. S. Patent 2,380,304.

Suitable methylenemalonic acid esters for use in the invention are those derived from alkanols of from 1 to 4 carbon atoms, e. g., methanol, ethanol, propanol, isopropanol, butanol, isobutanol, including the halogenated alkanols, especially chloroalkanols, e. g., beta-chloroethanol, etc., particularly the symmetrical diesters, e. g., dimethyl, diethyl and dipropyl methylenemalonates, although mixed esters may also be employed.

The operable 1,3-butadienes are those represented by the formula $CH_2=CR—CH=CH_2$, wherein R is one of the radicals hydrogen, chlorine and methyl; namely, 1,3-butadiene, 2-methyl-1,3-butadiene (isoprene), and 2-chloro-1,3-butadiene (chloroprene). The first two of these dienes are especially preferred, since their tendency to form an alternating structure is considerably more marked than is that of 2-chloro-1,3-butadiene.

In contrast to the methylenemalonic esters employed in this invention, the methylenemalonic esters derived from alcohols having more than four carbon atoms (e. g., the dihexyl and the di-(2 - ethylhexyl) esters) copolymerize very slowly with these 1,3-dienes and give very low molecular weight products. Thus, the di-(2-ethylhexyl) methylenemalonate when copolymerized with butadiene gives a copolymer having an intrinsic viscosity of less than 0.1. Such low molecular weight copolymers are unsuitable for making molded articles or drawn fibers, because of their very low tensile strength.

In preparing the copolymers of this invention, the desired alternating structure is obtained even though wide variations in the mole ratio of the 1,3-butadiene to the dialkyl methylenemalonate in the initial reaction mixture are permitted, provided that the polymerization is stopped when essentially all of that monomer which is present in the lower proportion is exhausted. This is not difficult to do, as the speed of reaction is greatly reduced at this point. However, it is preferred to use these monomers in mole ratios in the range from 4:1 to 1:4, and more preferably in essentially equi-molar amounts so as to obtain the highest conversion of monomers to the copolymeric form.

In the case of 1,3-butadiene or of 2-methyl-1,3-butadiene, the copolymers resulting from these feed ratios, or even from wider ratios, usually contain combined diene and methylenemalonic ester in molar ratio in the range from 1.4:1 to 1:1.4, when 80% of the monomer present initially in the lower mole fraction is exhausted.

In the case of 2-chloro-1,3-butadiene, the desired alternating structure is most readily obtained with a feed ratio of diene to methylenemalonic ester in the more restricted range from 2:1 to 1:4. The copolymers resulting from these feed ratios usually contain combined 2-chloro-1,3-butadiene and methylenemalonic ester in mole ratio of from 1.5:1 to 1:1.7.

The preferred products consist mainly of the essentially 1:1 mole ratio copolymer, and, because of their substantially uniform composition, optimum physical properties of the products are readily realized. These products are contrasted to the great majority of other copolymers of 1,3-butadienes, which are of non-uniform structure, except for a few cases wherein somewhat uniform structure is obtainable by relatively inconvenient and troublesome methods of preparation involving incremental addition of one of the monomers to the reaction mixture.

The copolymerization may be carried out by oil phase polymerization, usually at temperatures in the range of $-40°$ to $+70°$ C., with or without solvents or diluents, in the presence of a suitable polymerization initiator, i. e., a free-radical type catalyst-promotor, usually in amounts of 0.01 to 5.0% on the combined weight of monomeric material. Such catalysts include peroxy compounds such as benzoyl peroxide, acetyl peroxide, tertiary-butyl hydrogen peroxide, cumene hydroperoxide, hydrogen peroxide; the azo polymerization catalysts such as alpha,alpha'-azobis-(alpha-alkylalkanoic) acids and derivatives hydrolyzable thereto; e. g., alpha,alpha'-azobisisobutyronitrile; alpha, alpha'-azobis(alpha-ethylpropionitrile); aryl azo aryl sulfides or so-called aromatic diazo thio ethers, e. g. p-methoxy benzene diazo thio 2-naphthyl ether; aryl azo aryl sulfones (disclosed and claimed as polymerization catalysts in an application of Robert W. Brown, Serial No. 46,550, filed August 27, 1948), e. g., 2,4-dimethylphenylazo p-tolyl sulfone; hydrazine derivatives, e. g. hydrazine hydrochloride, hydrazine sulfate, dibenzoyl hydrazine; metal alkyls, e. g., tetraethyl lead. The selection of the catalyst in any particular case depends mainly on the temperature at which the polymerization is to be run. In general, it is advantageous to carry out the polymerization as rapidly as possible at a given temperature, in order to minimize the formation of the uncatalyzed non-polymeric Diels-Alder addition product. Ultra-violet light (2500 to 4000 Å.) also may be employed to promote the reaction, preferably in conjunction with photosensitizers such as the above-mentioned azo compounds, or biacetyl or benzil.

It has also been found (cf. application Serial No. 87,568 of Roswell H. Ewart and Wendell V. Smith filed concurrently herewith and assigned to the same assignee as the instant application) that emulsion polymerization is particularly advantageous as a method of copolymerizing these monomers, because of the unexpectedly rapid reaction, the copolymerization being substantially completed under proper conditions in less than one hour at 0° C. The extreme rapidity of this copolymerization reaction is in marked contrast to the slower copolymerization reactions of 1,3-butadiene with other monoolefinic compounds usually encountered.

It is found that the tendency of these copolymers to crystallize is dependent on the temperature of copolymerization, those copolymers prepared at 0° C. crystallizing much more readily than those prepared at 30° or 50° C. Thus, the copolymer of diethyl methylenemalonate with butadiene, when polymerized at 0° C., begins to harden due to crystallization in a matter of several hours, while those polymerized at 30° C. require several days to begin to show evidence of crystallization. This increased speed of crystallization which is obtained by low temperature polymerization is a particularly valuable property when making molded articles since the more rapid hardening due to crystallization enables the object to be removed from the mold sooner without distortion.

Another advantage in using fast low-temperature polymerization is that undesirable side reactions, such as the Diels-Alder addition, are suppressed to the extent of virtual elimination. This makes it possible to obtain high yields of the desired copolymer.

The emulsifying agent used for the emulsion polymerization is selected from those classes which are acid stable, i. e., which are not precipitated in the pH region from 4.0 to 9.0 (e. g. anionic emulsifying agents such as sodium lauryl sulfate, the sodium salt of sulfonated diamyl or dioctyl ester of succinic acid, etc.; non-ionic emulsifying agents such as the reaction products of ethylene oxide with alcohols or phenols such as isopropyl phenol; cationic emulsifying agents such as dodecylamine hydrochloride).

In such an emulsion the reaction is very fast at 50° C., particularly in the presence of 0.01 to 5% of a water-soluble peroxidic polymerization catalyst such as potassium peroxydisulfate and 0.1-3% of an alkanethiol polymerization regulator such as tertiary-butyl mercaptan or dodecyl mercaptan (the weights being referred to the combined weights of the monomeric materials).

It has been found desirable, in order to get higher yields and improved polymer properties, to carry out the emulsion at lower temperatures, i. e., below 30° C. and preferably even below 0° C., in the presence of an activator. Thus, although practically no polymer is formed in seven hours at 0° C., it has been found that the addition of 0.0001% to 0.2% of the salt of a multivalent metal, particularly an iron salt, e. g., ferrous sulfate or ferric sulfate, or others such as cobalt nitrate, causes an enormous acceleration of the reaction, so that polymerization is substantially completed in less than one hour at 0° C. This formulation is particularly useful at temperature of —5° to +30° C. When the polymerization is carried out at temperatures below the freezing point of the aqueous emulsion, it is necessary to add suitable antifreeze agents such as methanol, ethylene glycol or glycerine.

The speed of these low temperature emulsion copolymerizations is surprising in view of the slowness with which the dienes and the malonic esters each homopolymerize under these conditions.

At the conclusion of the copolymerization the reaction may be short-stopped by an inhibitor such as hydroquinone, and the latex used as such or the polymer can be isolated by precipitation or preferential extraction, or by evaporation of any solvents or diluents which may be present.

The resulting copolymers constitute a new class of tough plastics which are insoluble in petroleum oils (i. e., aliphatic hydrocarbon oils, such as Pennsylvania crude oil and fractions thereof), but are soluble in a variety of solvents, e. g., benzene and hot acetone, and in the form of such solutions they may be employed in coating and impregnating compositions, as well as in the casting of films. Because of their insolubility in petroleum oils, these plastic copolymers are particularly useful for production of surface coatings, tubing, gaskets, and other articles which are to be used in contact with lubricating oils and the like, wherein resistance to the swelling or solvent action of petroleum oil is required. The physical properties, e. g., flexibility and softening point, of the copolymers vary with the choice of the specific monomeric reactants. In many cases desirable variations in the properties of the products may be obtained by employing in the monomer charge, in place of a single methylenemalonic ester and a single diene, a mixture of methylenemalonic esters (usually two such esters) and/or a mixture of dienes of the classes defined previously (usually two such dienes). Hence, numerous and advantageous modifications in the properties of the products can be readily achieved to meet the requirements of various commercial applications.

The copolymers, particularly the higher melting ones, may be formed into filaments which are of particular interest because they crystallize readily, and they are capable of being cold-drawn, whereby their original length can be substantially increased and higher tensile strength attained.

The utility of the copolymers is further increased by their residual unsaturation, which permits them to undergo various polymerization or cross-linking reactions, whereby the copolymers are transformed to solvent-resistant products.

The tough, plastic copolymers of this invention are non-rubbery materials, generally having a reversible extensibility of less than 50% at room temperature, that is, they do not retract forcibly to their original length after being extended more than 50%. In common with other crystalline polymers such as balata, nylon and high melting polyesters below their melting points, these materials will cold-draw when a tensile force exceeding a critical value is applied thereto. Under suitable conditions, the whole sample may be drawn to about 8 to 12 times its original length. In this oriented filament form the material has a permanent elasticity enabling it to be stretched 20 to 100 per cent. That such a fibrous material has a field of application which is different from that of rubbery materials is due to (1) a very high modulus of elasticity (about 10 times that of a rubber-carbon black stock), (2) low elongation at break (usually less than 100 per cent) and (3) the fact that the oriented fiber will shrink or retract to a small per cent of its drawn length if heated near the melting point of the polymer.

That the copolymers of the present invention are of highly alternating structure is indicated by the extremely well-defined X-ray powder and spot patterns obtained from the unoriented and oriented polymers. These patterns are very different from those obtained from polybutadiene or from polymerized methylenemalonates.

The following examples disclose the invention in more detail.

EXAMPLE 1

A mixture of 6.28 g. of diethyl methylenemalonate, 1.047 g. of 1,3-butadiene (mole ratio 1.4:1) and 0.025 g. of alpha, alpha'-azobisisobutyronitrile is sealed in a tube constructed from a glass which is transparent to ultra-violet light. The tube and its contents are then irradiated at 0° C. for 20 hours with a Hanovia H-3 high pressure mercury arc (wave length=ca. 3600 Å.) at a distance of approximately 5 cm. At the end of the reaction, the contents of the tube are dissolved in a minimum volume of benzene and the copolymer is precipitated by the addition of n-hexane. After drying to constant weight, there are obtained 1.474 g. of benzene-soluble copolymer which shows a high degree of crystallinity as indicated by the X-ray powder diagram.

Analysis: Found, 63.95% C; 8.09% H, corresponding to a copolymer containing copolymerized butadiene and diethyl methylenemalonic ester in the molar ratio of 1.04:1.00, i. e., substantially 1:1. The copolymer melts at about 85° C.; elastic threads can be drawn from the product.

One gram of the copolymer is milled with 0.03 g. of zinc 2-ethylhexanoate, 0.02 g. of selenium dibutyldithiocarbamate and 0.01 g. of sulfur, and the mixture is heated in a mold for 30 minutes at 120° C. The resulting cross-linked product is insoluble in benzene and is crystalline, as indicated by X-ray analysis.

EXAMPLE 2

A mixture of 3.50 g. of diethyl methylenemalonate, 1.50 g. 1,3-butadiene (mole ratio 1:1.4) and 0.05 ml. of dodecyl mercaptan at 0° C. are added to 10 ml. of an aqueous solution containing 4.0% by weight of sodium lauryl sulfate and 0.175% of potassium peroxydisulfate. Three such emulsions are prepared and held in a 50° C. bath for periods of 5, 10 and 15 minutes respectively. The reaction mixtures are then cooled, and the copolymers are precipitated by the addition of methanol, washed with a methanol-water mixture, and dried at 60° C. to yield 2.7 g., 3.3 g., and 4.1 g. of copolymer, respectively.

Analysis of the 15-minute reaction product:

Found: 63.6% carbon; 8.27% hydrogen; Wijs iodine number, 106.
Theory: (for 1:1 copolymer) 63.7% carbon; 8.02% hydrogen; Wijs iodine number, 112.

EXAMPLE 3

In the manner of Example 2 above, butadiene is copolymerized with various other alkyl methylenemalonates in aqueous emulsion at 50° C. These reactions are summarized below in Table I.

Table I

| | Weight of Reactants | | Reaction Time (Hours at 50° C.) | Amount | Copolymeric Product Melting Point |
|---|---|---|---|---|---|
| | Butadiene | Methylene-malonate | | | ° C. |
| a | 9.17 | Diisopropyl ester, 27.2 | 1.5 | 24.0 | |
| b | 1.5 | Di-n-butyl ester, 3.5 [1] | 1.0 | 2.9 | ca. 45 |
| c | 4.3 | Diisobutyl ester, 12.0 | 1.5 | 7.9 | ca. 55 |

[1] 0.05 g. of dodecyl mercaptan added.

Table II

| Ex. 6 | Reactants | | Copolymer | | | | |
|---|---|---|---|---|---|---|---|
| | 1,3-Alkadiene | Dialkyl Methylenemalonate | Iodine No. | Intrinsic Viscosity (In Benzene) | $T_s$, Second Order Transition Temp. | Melting Point | Crystalline (By X ray) |
| | | | | | ° C. | ° C. | |
| a | 1,3-Butadiene | Dimethyl ester | | | 18 | 145-150 | Yes. |
| b | do | Diethyl ester | | 6.3 | -19 | 85 | Do. |
| $b_1$ | do | Di-beta-chloroethyl ester | | | | 100 | Do. |
| c | do | Di-n-propyl ester | | | -20 | 44 | Do. |
| d | do | Diisopropyl ester | 101.2 | 1.64 | -1.5 | 142 | Do. |
| e | do | Di-n-butyl ester | 92.4 | 3.53 | -26 | 61 | Do. |
| f | 2-Methyl-1,3-butadiene | Dimethyl ester | | | 29 | 125 | Do. |
| g | do | Diethyl ester | 107.4 | 1.38 | 11 | 100 | Do. |
| h | do | Di-n-propyl ester | | | -16 | 68 | Do. |
| i | do | Diisopropyl ester | | | 28 | 138 | Do. |
| j | do | Di-n-butyl ester | | | -25 | 47 | Do. |
| k | 2,3-Dimethyl-1,3-butadiene | Diethyl ester | | 1.18 | 11 | | No. |
| l | do | Diisopropyl ester | | 1.05 | 23 | | Do. |
| m | do | Dibutyl ester | | | -20 | | Do. |

EXAMPLE 4

To a mixture of 1.98 g. of diethyl methylenemalonate, 1.95 g. of 1,3-butadiene and 0.02 ml. of dodecyl mercaptan are added 10 ml. of an aqueous solution containing 2.0% by weight of sodium lauryl sulfate and 0.175% of potassium peroxydisulfate. The copolymerization is effected by heating the mixture at 30.8° C. for 5 hours, and the product is isolated and purified as in Example 2 to yield 1.93 g. of copolymer, M. ca. 65° C.

One hundred grams of this copolymer are milled with 2.0 g. of stearic acid, 3.0 g. of zinc oxide, 0.7 g. of 2-mercaptobenzothiazole and 1.5 g. of sulfur, and the mixture is heated in a mold for 60 minutes at 142° C., to form a strong, insoluble cross-linked product.

EXAMPLE 5

To a mixture of 20.8 g. of diethyl methylenemalonate, 8.9 g. of 1,3-butadiene and 0.3 ml. of dodecyl mercaptan are added 60 ml. of an aqueous solution containing 2% of sodium lauryl sulfate and 0.033% of potassium peroxydisulfate. The resulting emulsion is cooled to 0° C., and 3 ml. of a 0.14% aqueous solution of ferrous sulfate heptahydrate are added. The reaction begins immediately and the reaction temperature is maintained at ca. 0° C. only by very efficient cooling. The reaction is completed within 50 minutes, and 23 g. of copolymer are obtained from the reaction mixture by the method of Example 2.

Analysis:
Found: 56.32% carbon; 7.06% hydrogen;
Theory: 56.46% carbon; 5.92% hydrogen.

EXAMPLE 6

In the manner of Example 5, various 1,3-butadienes and dialkyl-methylenemalonates are copolymerized at 0° C. in aqueous emulsion. The reactant monomers and the properties of the resulting copolymers are summarized in Table II, which also includes the butadiene-diethyl methylenemalonate copolymer of Example 5. Examples k, l and m of Table Table II show that a non-crystalline copolymer is obtained when 2,3-dimethyl-1,3-butadiene is employed. This is in contrast to the crystalline product obtained with 1,3-butadiene, 2-methyl-1,3-butadiene, or 2-chloro-1,3-butadiene.

A film is cast on a glass plate from a benzene solution of the copolymer of 2-methyl-1,3-butadiene and diethyl methylenemalonate (Example 6–g). After the solvent has evaporated, the film is removed from the glass and a strip of this material is cold-drawn to yield a tough, flexible, translucent, moisture-resistant filament.

EXAMPLE 7

In the manner of Example 5 a copolymer of (A) butadiene and (B) an equimolar mixture of diisopropyl methylenemalonate and dibutyl methylenemalonate is prepared. This copolymer is crystalline and has a melting point intermediate between that of the butadiene-diisopropyl methylenemalonate and the butadiene-butyl methylenemalonate copolymers.

EXAMPLE 8

In the manner of Example 5, chloroprene and diisopropyl methylenemalonate are copolymerized at 0° C. in aqueous emulsion. The copolymer has a crystalline X-ray diffraction pattern, and has a melting point of about 150° C. The molar ratio of combined chloroprene to diisopropyl methylenemalonate in the copolymer is substantially 1:1.

EXAMPLE 9

In the manner of Example 1, except that no alpha, alpha'-azobis(isobutyronitrile) is used, a mixture of 1.32 g. of chloroprene (0.0150 mole) and 9.0 g. of diethyl methylenemalonate (0.061 mole) is polymerized at 0°–5° C. for about 10 hours. A yield of 1.44 g. of purified polymer is obtained, which is crystalline, as shown by an X-ray picture.

Analysis: Found, 13.55% chlorine, corresponding to a copolymer containing copolymerized chloroprene and diethyl methylenemalonate in the mole ratio of 0.85:1.00. The copolymer softens at about 85° C.

Having thus described our invention, what we claim and desire to protect by Letters Patent is:

1. A fiber-forming copolymer of (A) a 1,3-butadiene of the formula $CH_2=CR-CH=CH_2$, wherein R is selected from the group consisting of hydrogen, chlorine, and methyl, with (B) a diester of methylenemalonic acid with an alcohol selected from the group consisting of alkanols and haloalkanols wherein the alkyl and haloalkyl groups have from 1 to 4 carbon atoms each, the molar ratio of (A) to (B) combined in the copolymer being in the range from 1.4:1 to 1:1.7, and (A) and (B) being the sole polymerizable monomers.

2. A tough, plastic, petroleum oil-insoluble, crystalline, alternating, fiber-forming copolymer of (A) from one to two 1,3-butadienes of the formula $CH_2=CR-CH=CH_2$, wherein R is selected from the group consisting of hydrogen, chlorine and methyl, with (B) from one to two diesters of methylenemalonic acid with an alcohol selected from the group consisting of alkanols and haloalkanols wherein the alkyl and haloalkyl groups have from 1 to 4 carbon atoms each, the molar ratio of (A) to (B) combined in the copolymer being in the range from 1.5:1 to 1:1.7 and (A) and (B) being the sole polymerizable monomers.

3. A copolymer as in claim 2 in which (A) is 1,3-butadiene.

4. A copolymer as in claim 2 of (A) 1,3-butadiene with (B) diisopropyl methylenemalonate.

5. A copolymer as in claim 2 of (A) 1,3-butadiene with (B) diethyl methylenemalonate.

6. A copolymer as in claim 2 in which (B) is di-beta-chloroethyl methylenemalonate.

7. A copolymer as in claim 2 of (A) 1,3-butadiene with (B) di-beta-chloroethyl methylenemalonate.

8. A copolymer as in claim 2 in which (A) is 2-methyl-1,3-butadiene.

9. A copolymer as in claim 2 in which (A) is 2-chloro-1,3-butadiene.

10. A tough, petroleum oil-insoluble, crosslinked, benzene-insoluble copolymer of (A) a 1,3-butadiene of the formula $CH_2=CR-CH=CH_2$, wherein R is selected from the group consisting of hydrogen, chlorine, and methyl, with (B) a diester of methylenemalonic acid with an alcohol selected from the group consisting of alkanols and haloalkanols wherein the alkyl and haloalkyl groups have from 1 to 4 carbon atoms each, the molar ratio of (A) to (B) combined in the copolymer being in the range from 1.4:1 to 1:1.7 and (A) and (B) being the sole polymerizable monomers.

11. A copolymer as in claim 10 in which (A) is 1,3-butadiene.

12. An oriented filament of a petroleum oil-insoluble, plastic copolymer of (A) a conjugated 1,3-butadiene of the formula $$CH_2=CR-CH=CH_2$$

wherein R is selected from the group consisting of hydrogen, chlorine, and methyl, with (B) a diester of methylenemalonic acid with an alcohol selected from the group consisting of alkanols and haloalkanols wherein the alkyl and haloalkyl groups have from 1 to 4 carbon atoms each, the molar ratio of (A) to (B) combined in the copolymer being in the range from 1.4:1 to 1:1.7 and (A) and (B) being the sole polymerizable monomers.

13. A process of preparing a fiber-forming, petroleum-oil insoluble, crystalline copolymer which comprises subjecting a mixture of (A) a 1,3-butadiene of the formula $CH_2=CR-CH=CH_2$, wherein R is selected from the group consisting of hydrogen, chlorine and methyl with (B) a diester of methylenemalonic acid with an alcohol selected from the group consisting of alkanols and haloalkanols wherein the alkyl and haloalkyl groups have from 1 to 4 carbon atoms each, to the action of a free-radical polymerization catalyst, the molar ratio of (A) to (B) in the mixture being within the range from 1:4 to 4:1, and (A) and (B) being the sole polymerizable monomers.

14. A process as in claim 21 in which (A) is 1,3-butadiene.

15. A process as in claim 21 in which (A) is 1,3-butadiene and (B) is diisopropyl methylenemalonate.

16. A process as in claim 21 in which (A) is 1,3-butadiene and (B) is diethyl methylenemalonate.

17. A process as in claim 21 in which (A) is 1,3-butadiene and (B) is di-beta-chloroethyl methylenemalonate.

18. A process as in claim 21 in which (B) is di-beta-chloroethyl methylenemalonate.

19. A process as in claim 21 in which (A) is 2-chloro-1,3-butadiene.

20. A process as in claim 21 in which (A) is 2-methyl-1,3-butadiene.

21. A process of preparing a tough, plastic, petroleum oil-insoluble, crystalline, alternating, fiber-forming copolymer which comprises subjecting a mixture of (A) from one to two 1,3-butadienes of the formula $CH_2=CR-CH=CH_2$, wherein R is selected from the group consisting of hydrogen, chlorine and methyl with (B) from one to two diesters of methylenemalonic acid with alcohols selected from the group consisting of alkanols and haloalkanols wherein the alkyl and haloalkyl groups have from 1 to 4 carbon atoms each, to the action of a free-radical polymerization catalyst, the molar ratio of (A) to (B) in the mixture being within the range from 1:4 to 4:1, and (A) and (B) being the sole polymerizable monomers.

KENNETH W. DOAK.
KENNETH E. WILZBACH.

REFERENCES CITED

The following references are of record in the file of this patent:

UNITED STATES PATENTS

| Number | Name | Date |
| --- | --- | --- |
| 2,136,423 | Fields et al. | Nov. 15, 1938 |
| 2,212,506 | Bachman et al. | Aug. 27, 1940 |
| 2,266,794 | Pannwitz et al. | Dec. 23, 1941 |
| 2,330,033 | D'Alelio | Sept. 21, 1943 |
| 2,457,872 | D'Alelio | Jan. 4, 1949 |
| 2,462,354 | Brubaker et al. | Feb. 22, 1949 |

OTHER REFERENCES

Starkweather et al.: Article in Ind. Eng. Chem., vol. 39, pages 210–221, Feb. 1947.